US009428134B2

(12) United States Patent
 Hiraiwa et al.

(10) Patent No.: US 9,428,134 B2
(45) Date of Patent: Aug. 30, 2016

(54) SIDE AIRBAG APPARATUS

(71) Applicant: TOYODA GOSEI CO., LTD., Kiyosu-shi, Aichi-ken (JP)

(72) Inventors: Takuya Hiraiwa, Kiyosu (JP); Yuji Sato, Kiyosu (JP); Takashi Iida, Kiyosu (JP); Masashi Hotta, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/326,530

(22) Filed: Jul. 9, 2014

(65) Prior Publication Data
 US 2015/0021884 A1    Jan. 22, 2015

(30) Foreign Application Priority Data

Jul. 19, 2013  (JP) ................................. 2013-150649

(51) Int. Cl.
 *B60R 21/207*   (2006.01)
 *B60R 21/233*   (2006.01)
 *B60R 21/231*   (2011.01)

(52) U.S. Cl.
 CPC ........... *B60R 21/207* (2013.01); *B60R 21/231* (2013.01); *B60R 21/233* (2013.01); *B60R 2021/23146* (2013.01)

(58) Field of Classification Search
 CPC .................. B60R 21/207; B60R 2021/23146; B60R 2021/0006
 USPC ............... 280/728.2, 729, 730.2, 742, 743.1, 280/743.2
 See application file for complete search history.

(56) References Cited

U.S. PATENT DOCUMENTS

| | | | | |
|---|---|---|---|---|
| 5,678,853 A | * | 10/1997 | Maly | 280/730.2 |
| 6,270,113 B1 | * | 8/2001 | Wipasuramonton et al. | 280/730.2 |
| 7,350,803 B2 | * | 4/2008 | Abramczyk et al. | 280/730.2 |
| 7,637,530 B2 | * | 12/2009 | Yamaji et al. | 280/730.2 |
| 7,695,004 B2 | * | 4/2010 | Inoue | 280/730.2 |
| 7,926,838 B2 | * | 4/2011 | Honda et al. | 280/729 |
| 8,480,128 B2 | | 7/2013 | Fukawatase et al. | |

(Continued)

FOREIGN PATENT DOCUMENTS

| | | |
|---|---|---|
| JP | 2011-189791 A | 9/2011 |
| JP | 2012-162136 A | 8/2012 |

(Continued)

OTHER PUBLICATIONS

Office action dated Apr. 19, 2016 issued in the corresponding JP patent application No. 2013-150649 (and English translation).

*Primary Examiner* — Darlene P. Condra
(74) *Attorney, Agent, or Firm* — Posz Law Group, PLC

(57) ABSTRACT

An airbag is formed in a bag shape by joining margins of one pair of main body cloth portions. Inflation gas is supplied from an inflator to the airbag according to an impact given from the side of a vehicle seat. With this supply, the airbag deploys and inflates. A longitudinal partition portion is laid between the one pair of main body cloth portions. The longitudinal partition portion partitions an interior of the airbag into a front part and a rear part and has a communication hole. An inside one of the main body cloth portions constituting the airbag is attached to a car. The airbag is attached to a side frame inside the vehicle seat at a position between a rear end of the inside main body cloth portion and the longitudinal partition portion.

1 Claim, 12 Drawing Sheets

(56) References Cited

U.S. PATENT DOCUMENTS

| | | | |
|---|---|---|---|
| 2008/0211274 A1* | 9/2008 | Tracht | B60N 2/5816 297/216.13 |
| 2011/0285119 A1* | 11/2011 | Yamamoto et al. | 280/743.2 |
| 2011/0298201 A1* | 12/2011 | Kobayashi et al. | 280/736 |
| 2012/0025499 A1* | 2/2012 | Shibayama et al. | 280/730.2 |
| 2012/0200072 A1* | 8/2012 | Fukawatase et al. | 280/741 |
| 2013/0076014 A1* | 3/2013 | Thomas | B60R 21/231 280/743.2 |

FOREIGN PATENT DOCUMENTS

| | | |
|---|---|---|
| JP | 2012-228986 A | 11/2012 |
| JP | 2013-082239 A | 5/2013 |

* cited by examiner

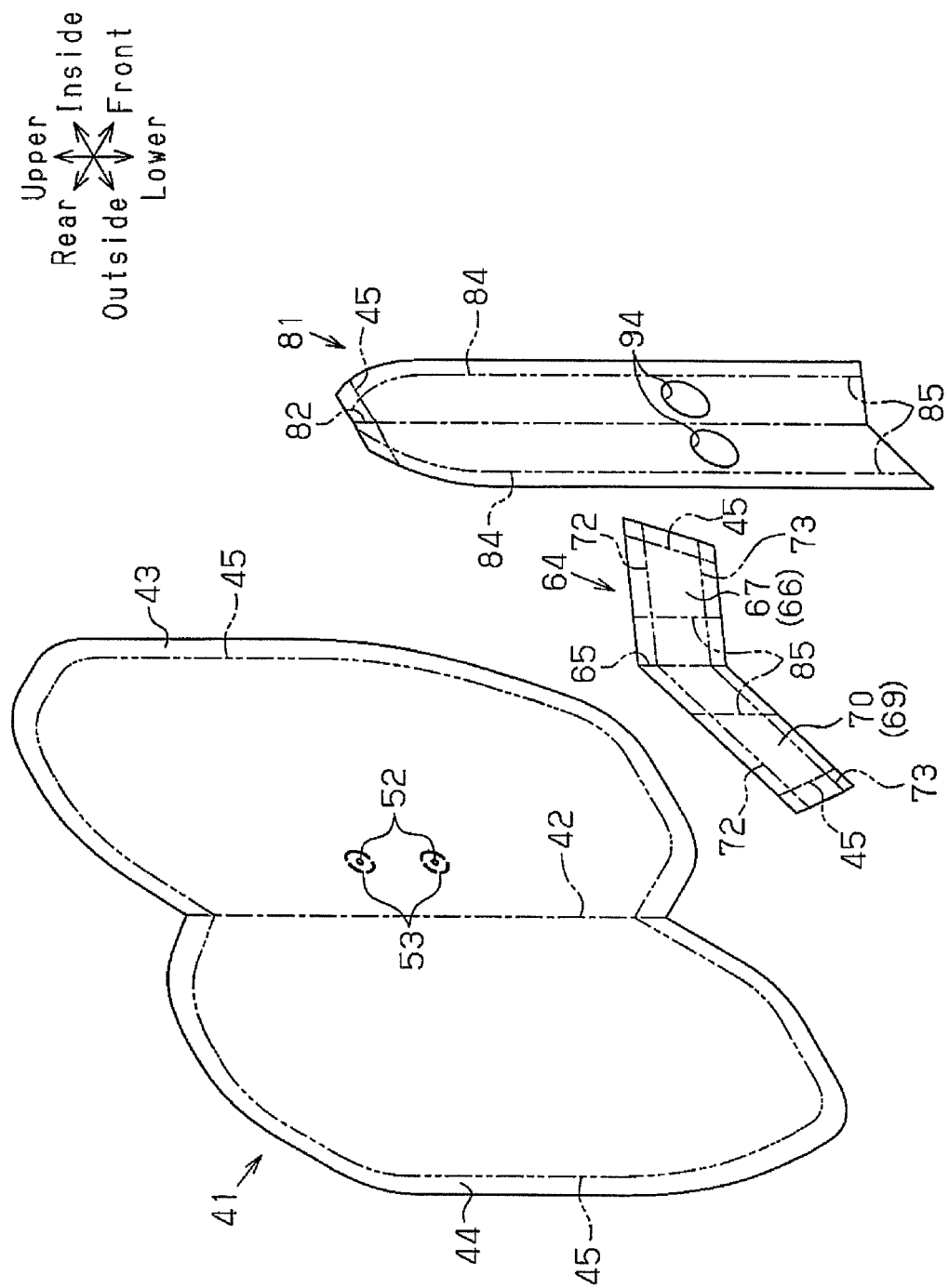

SIDE AIRBAG APPARATUS

BACKGROUND OF THE INVENTION

The present invention relates to a side airbag apparatus for deploying and inflating an airbag at the side of a passenger who is seated on a vehicle seat and protecting the passenger from an impact.

A side airbag apparatus of this type includes an airbag and an inflator. The airbag is incorporated in a seat back of a car seat in a folded state together with the inflator. For example, when an impact is given from the side to a side door of a car body, inflation gas is supplied from the inflator into the airbag. The airbag deploys and inflates forward from between the side door coming into a car and a passenger. As a result, the airbag restrains the passenger and mitigates an impact conveyed from the side to the passenger.

Japanese Patent Laid-Open No. 2012-162136 discloses a configuration in which an interior of an airbag is partitioned into two front and rear parts. As shown in FIGS. 19A and 20A, an airbag 121 is formed in a bag shape by joining margins of one pair of main body cloth portions 122 and 123. An inflator 124 is arranged at a rear end of the airbag 121 inside the airbag 121. The inflator 124 is attached to a seat frame 125 of a car seat via a locking member, such as a bolt, together with the main body cloth portion 122.

A longitudinal partition portion 126 having a communication hole (not shown) is laid between the two main body cloth portions 122 and 123. The airbag 121 is partitioned by the longitudinal partition portion 126 into a rear inflation chamber 127 and a front inflation chamber 128. The rear inflation chamber 127 is arranged behind the longitudinal partition portion 126. The rear inflation chamber 127 receives inflation gas supplied from the inflator 124. The front inflation chamber 128 is arranged in front of the longitudinal partition portion 126. The front inflation chamber 128 receives inflation gas supplied from the rear inflation chamber 127 through the communication hole. The longitudinal partition portion 126 is pulled at least at the time of inflation of the rear inflation chamber 127. The longitudinal partition portion 126 restricts an inflation thickness T1 which is a lateral thickness of the rear inflation chamber 127.

To increase the inflation thickness T1 of the rear inflation chamber 127, the position of the longitudinal partition portion 126 joined to the two main body cloth portions 122 and 123 needs to be shifted forward, as shown in FIG. 19B. The forward shift of the position of the longitudinal partition portion 126, however, increases a length L1 from a position of attachment of the airbag 121 to the seat frame 125 to a front end of the rear inflation chamber 127, as shown in FIG. 20B. This increases an amount by which the rear inflation chamber 127 protrudes, which may change the passenger-restraining capability and the passenger-protecting capability of the airbag.

SUMMARY OF THE INVENTION

An object of the present invention is to provide a side airbag apparatus in which an inflation thickness of a rear inflation chamber can be increased without changing a length from a position of attachment of an airbag to a vehicle to a front end of the rear inflation chamber.

In order to attain the above-described object, according to a first aspect of the present invention, there is provided a side airbag apparatus attached to a vehicle and including an airbag. The airbag is comprised of one pair of main body cloth portions that are overlaid on top of each other in a width direction of a vehicle seat. The airbag is formed in a bag shape by joining margins of the one pair of main body cloth portions. The airbag is deployed and inflated by inflation gas supplied from an inflator according to an impact given from the side of the vehicle seat. The airbag is partitioned by a longitudinal partition portion into a rear inflation chamber and a front inflation chamber. The longitudinal partition portion is laid between the one pair of main body cloth portions and has a communication hole. The rear inflation chamber is arranged behind the longitudinal partition portion. The rear inflation chamber receives inflation gas supplied from the inflator. The front inflation chamber is arranged in front of the longitudinal partition portion. The front inflation chamber receives inflation gas supplied from the rear inflation chamber through the communication hole. One of the one pair of main body cloth portions constituting the airbag is attached to the vehicle. The airbag is attached to the vehicle at a position between a rear end of the main body cloth portion attached to the vehicle and the longitudinal partition portion.

BRIEF DESCRIPTION OF THE DRAWINGS

FIG. 18 is a perspective view showing a plurality of members constituting an airbag;

DETAILED DESCRIPTION OF THE PREFERRED EMBODIMENTS

First Embodiment

A first embodiment in which the present invention is embodied in a side airbag apparatus mounted on a car will be described below with reference to FIGS. 1 to 15B. To describe the side airbag apparatus, the upper and lower sides, the front and rear, and the inside and outside are defined in the manner as shown in FIGS. 1 and 2.

Figure 1:
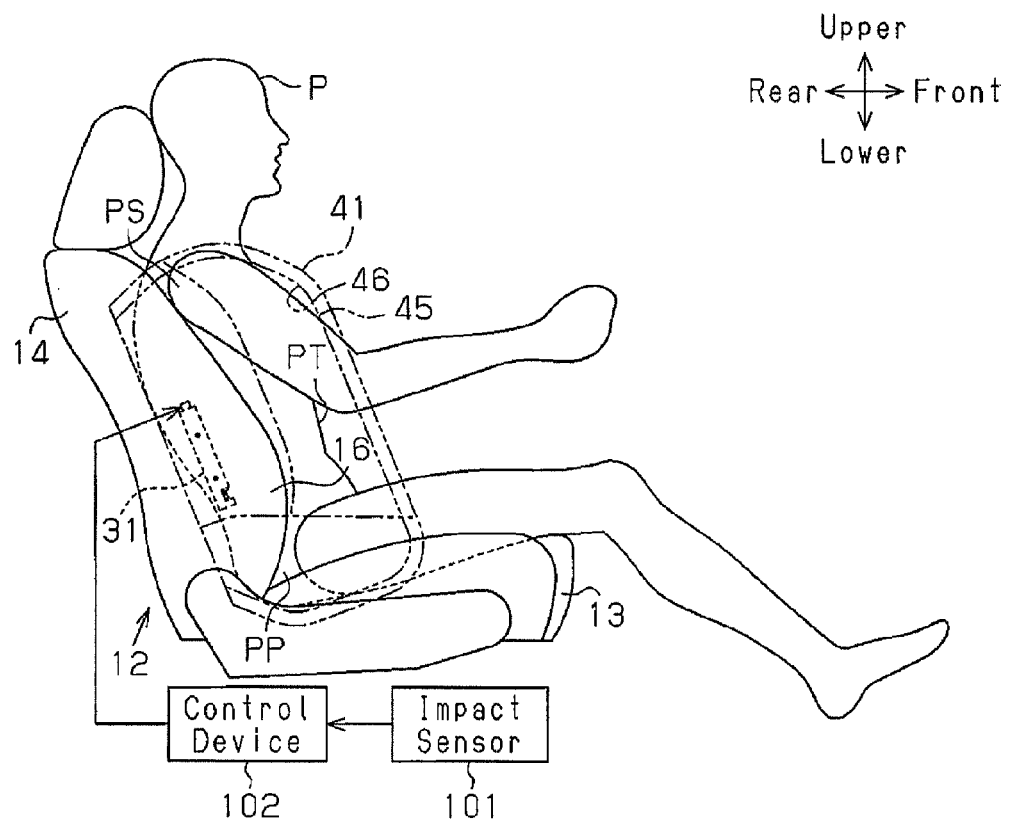
FIG. 1 is a side view showing a car seat including a side airbag apparatus according to a first embodiment of the present invention together with a passenger.
Figure 2:
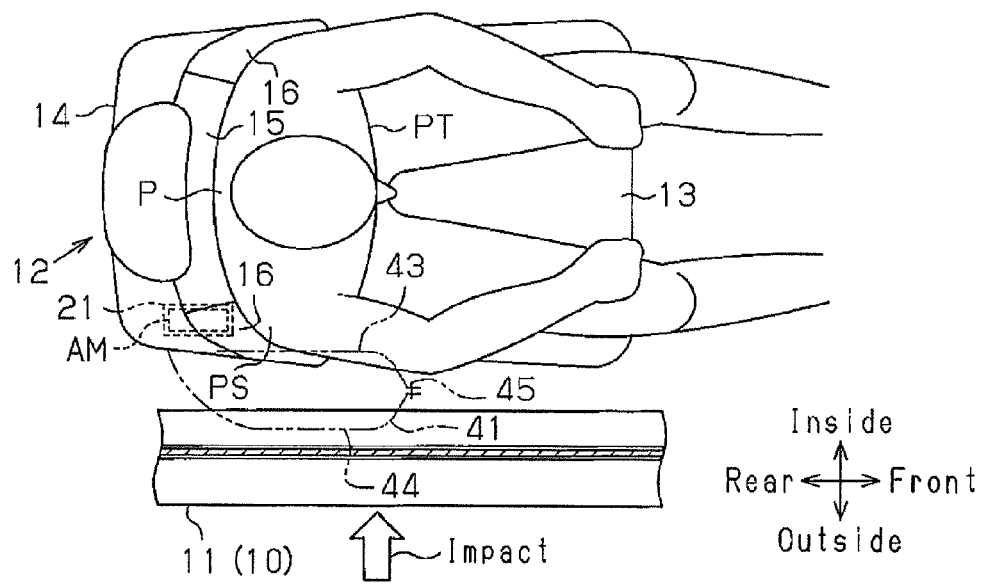
FIG. 2 is a plan view showing the respective positions of the car seat, an airbag, the passenger, and a side wall portion.

As shown in FIGS. 1 and 2, a car seat 12 is placed as a vehicle seat in a car 10 as a vehicle. The car seat 12 is arranged in the vicinity of an inside of a side wall portion 11. The side wall portion 11 is a member constituting a side portion of the car 10 and is composed of a door, a pillar, and the like. The side wall portion 11 corresponding to a front seat is composed of a front door, a center pillar (B pillar), and the like. The side wall portion 11 corresponding to a rear seat is composed of a rear portion of a side door (rear door), a C pillar, a front portion of a wheel housing, a rear quarter, and the like.

The car seat 12 includes a seat cushion 13 and a seat back 14. The seat back 14 stands from behind the seat cushion 13. The car seat 12 is fixed to the car 10 with the seat back 14 facing forward. A width direction of the car seat 12 is the same as a width direction of the car 10 and will be referred to as a lateral direction hereinafter.

The seat back 14 includes a seat back main body 15 and one pair of side support portions 16. The side support portions 16 are provided at respective side portions of the seat back main body 15. The seat back main body 15 is inclined rearward and supports an upper body of a passenger P from behind. The side support portions 16 protrude forward from the seat back main body 15. The side support portions 16 restrict sideways motion of the upper body of the passenger P sitting on the seat cushion 13 and leaning back against the seat back main body 15.

Figure 3:
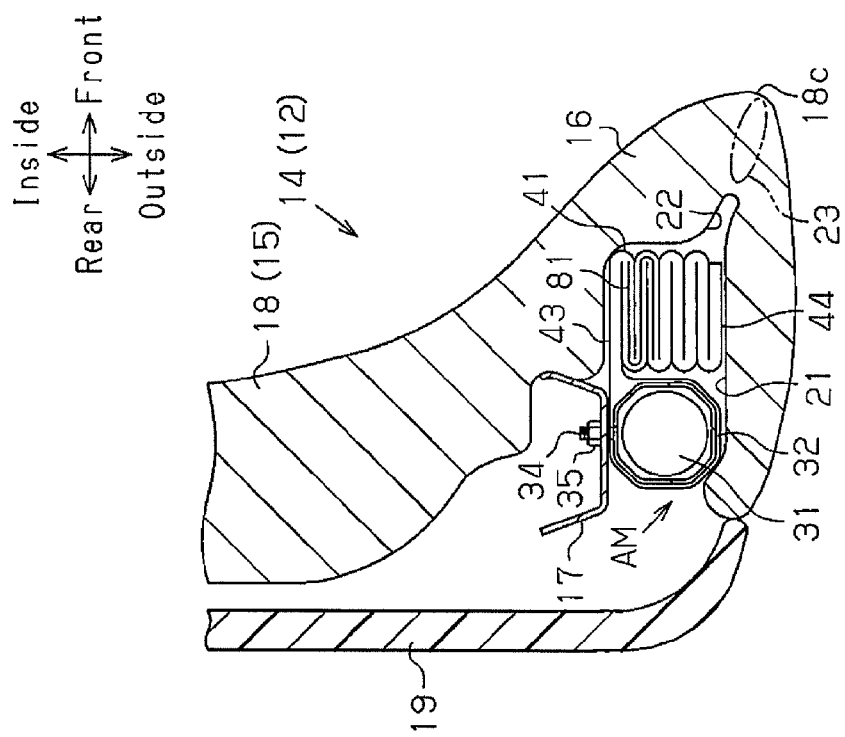
FIG. 3 is a partial plan view showing an airbag module incorporated in a seat back.

As shown in FIG. 3, a skeletal frame of the seat back 14 is formed of a seat frame. A part of the seat frame is arranged inside the seat back 14 and is formed as a side frame 17 by bending a metal plate. A seat pad 18 made of an elastic material, such as urethane foam, is arranged in front of the seat frame. A hard back board 19 made of, e.g., synthetic resin is arranged behind the seat frame. The seat pad 18 is coated with a skin (not shown).

A storage portion 21 is provided inside the seat pad 18. The storage portion 21 is formed outside the side frame 17. An airbag module AM serving as a main portion of the side airbag apparatus is incorporated in the storage portion 21. A slit 22 extends obliquely forward from the storage portion 21. As indicated by the alternate long and two short dashes line in FIG. 3, a portion 23 which is to be fractured by an airbag 41 is provided between a corner 18c of the seat pad 18 and the slit 22.

Figure 4:
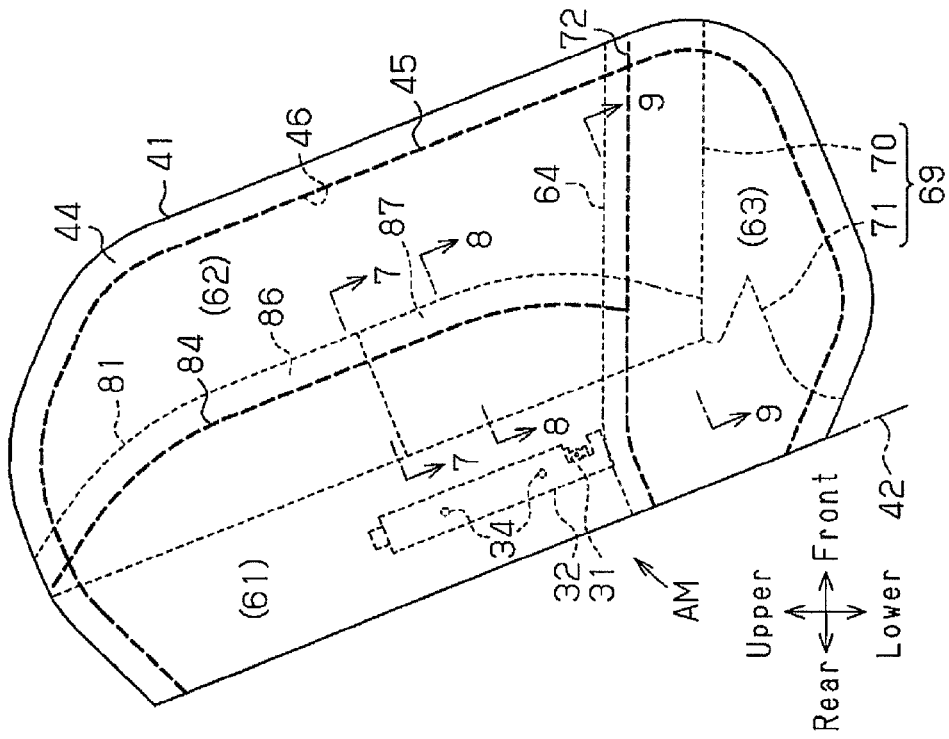
FIG. 4 is a side view showing the airbag module with the airbag flattened and deployed.
Figure 5:
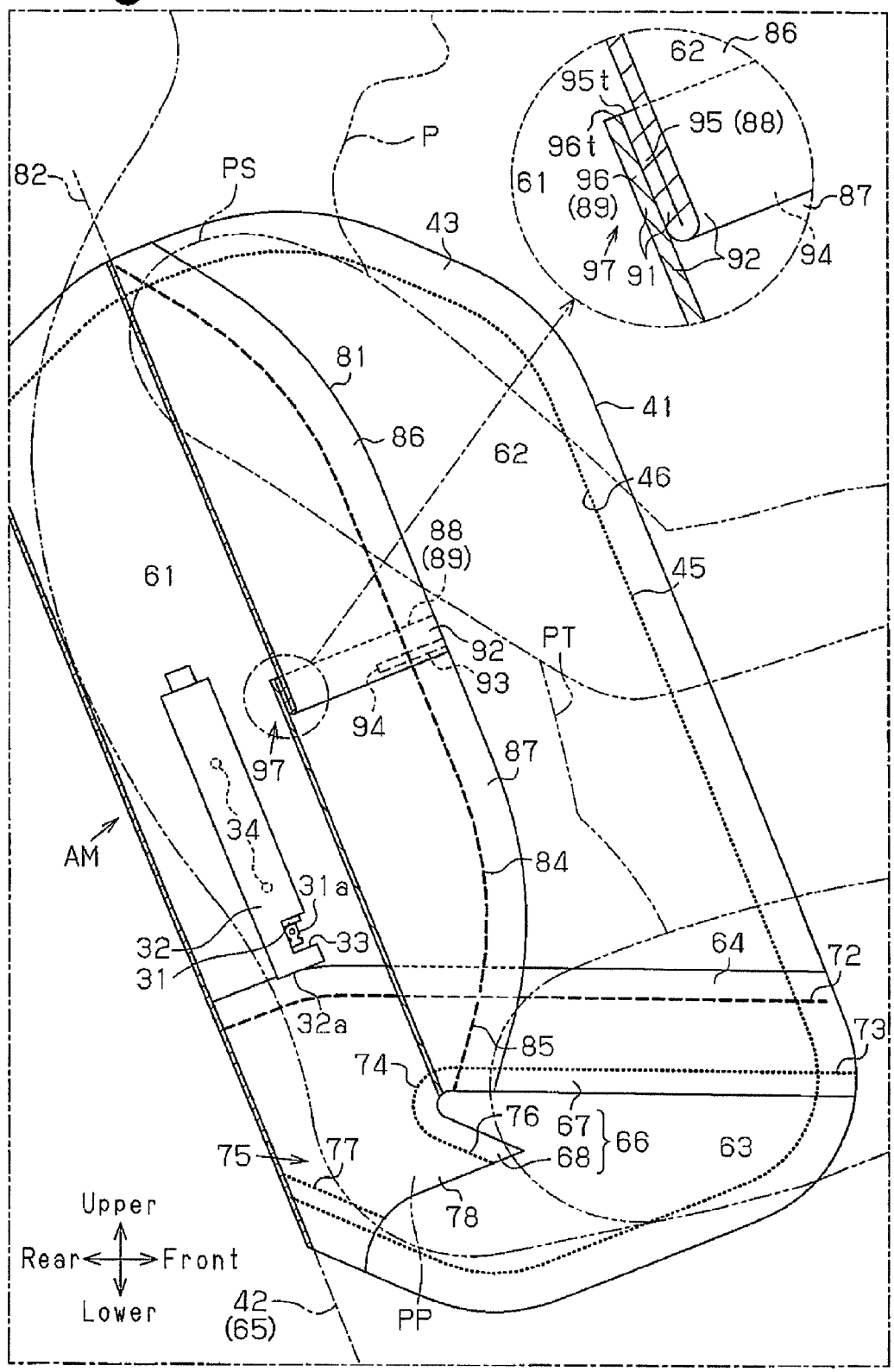
FIG. 5 is a side sectional view showing the internal structure of the airbag module together with the passenger.

As shown in FIGS. 3 to 5, an inflator assembly includes an inflator 31 and a retainer 32. A pyrotechnic inflator is adopted as the inflator 31. The substantially cylindrical inflator 31 contains a gas forming agent which forms inflation gas. A gas jetting portion 31a is formed at a lower end of the inflator 31. A harness serving as wiring through which an actuation signal is input to the inflator 31 is connected to an upper end of the inflator 31. A hybrid inflator may be used as the inflator 31. In this case, inflation gas is jetted by fracturing a partition wall of a compressed-gas cylinder filled with compressed gas using, e.g., gunpowder.

The retainer 32 functions as a diffuser which controls a jetting direction of inflation gas. The retainer 32 fastens the inflator 31 to the side frame 17 together with the airbag 41. The retainer 32 is formed in a substantially cylindrical shape by bending a plate material, such as a metal plate. An open end 32a is formed at a lower end of the retainer 32. The retainer 32 has a window 33 at a position corresponding to the gas jetting portion 31a of the inflator 31. Most of inflation gas jetted from the inflator 31 is jetted toward below and substantially in front of the retainer 32 through the open end 32a and the window 33. A plurality of bolts 34 are fixed to the retainer 32. With the bolts 34 as locking members, the retainer 32 is attached to the side frame 17. The inflator 31 may be integrated with the retainer 32.

As shown in FIGS. 4 and 5, the airbag 41 is formed in a bag shape by folding one piece of cloth called base cloth, panel cloth, or the like in half along a central bend line 42 and joining edges. In order to distinguish between an inside and an outside of the airbag 41, an inside portion of the airbag 41 is referred to as a main body cloth portion 43 while an outside portion of the airbag 41 is referred to as a main body cloth portion 44. Although the airbag 41 is formed by folding the piece of cloth in half along the bend line 42 in the first embodiment, the airbag 41 may be formed from two pieces of cloth divided along the bend line 42. In this case, the airbag 41 is formed in a bag shape by overlaying the two pieces of cloth on top of each other and joining the two pieces of cloth.

Figure 6:
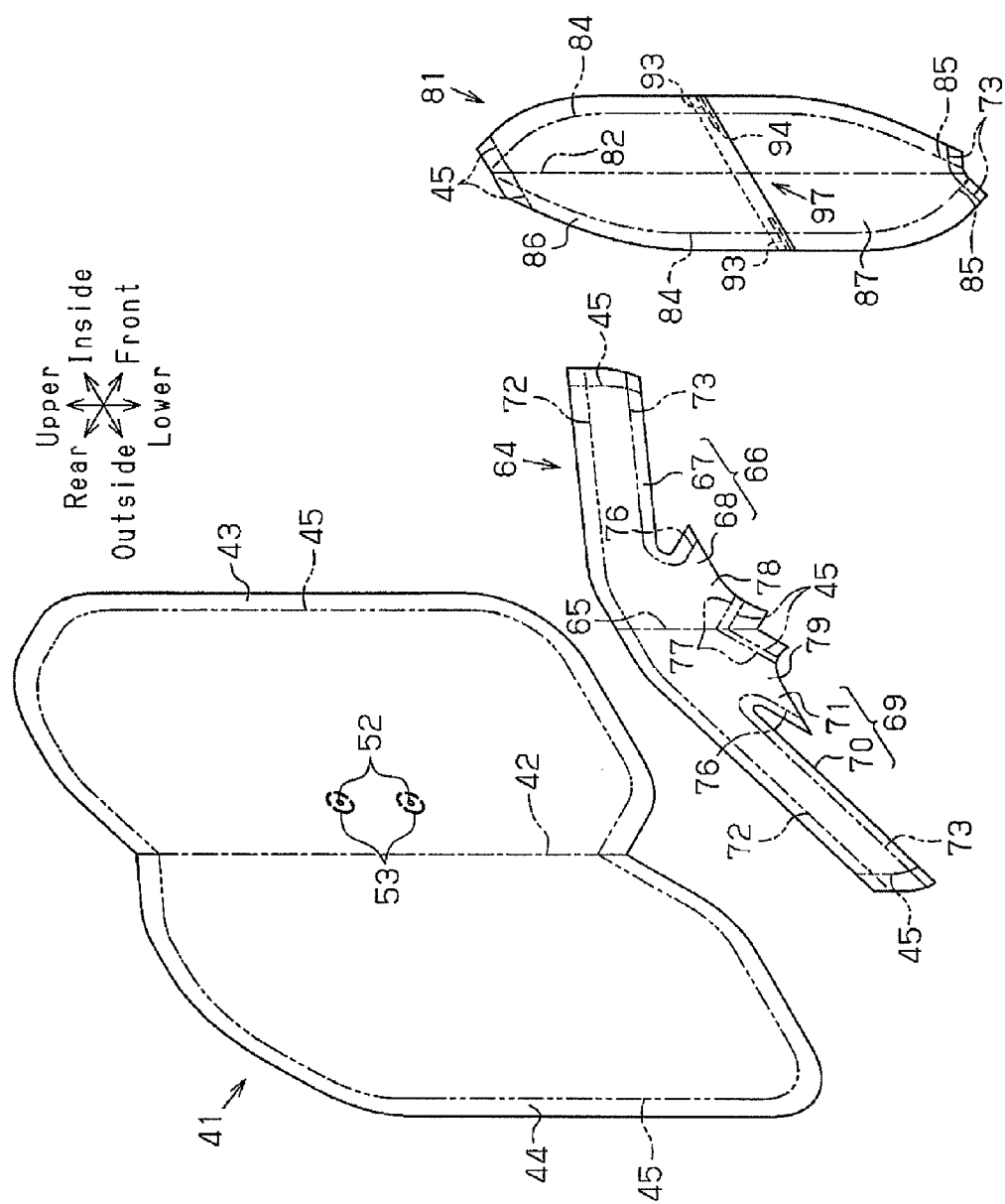
FIG. 6 is a perspective view showing a plurality of members constituting the airbag.
Figure 7:
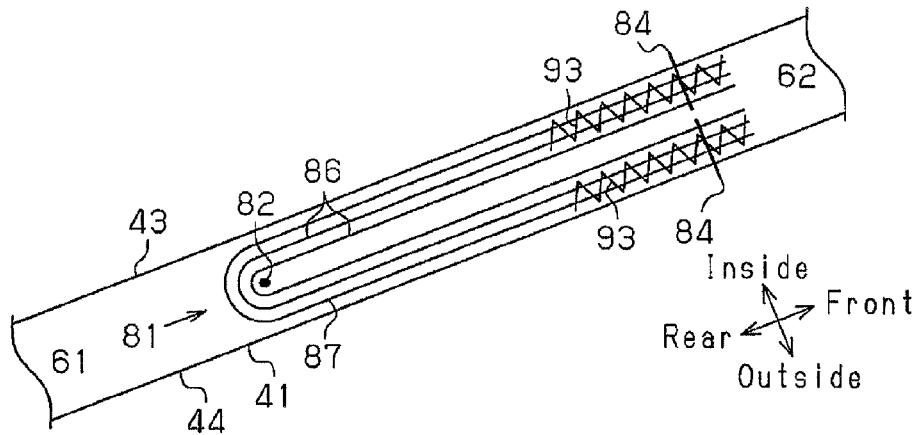
FIG. 7 is a local sectional view taken along line 7-7 in FIG. 4.
Figure 8:
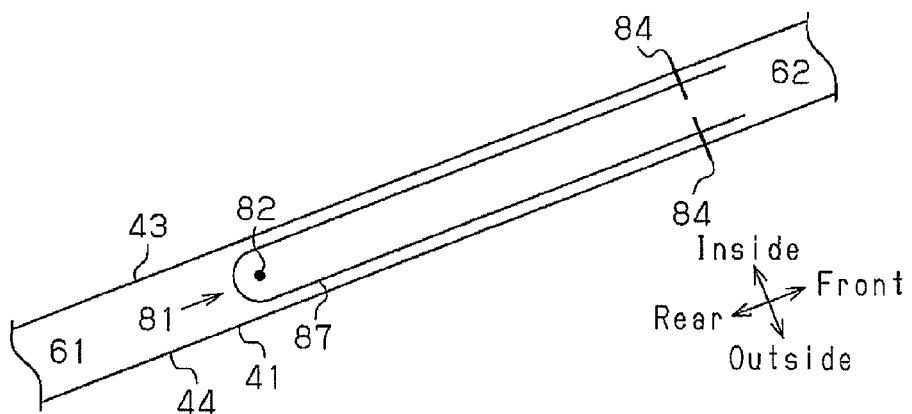
FIG. 8 is a local sectional view taken along line 8-8 in FIG. 4.
Figure 9:
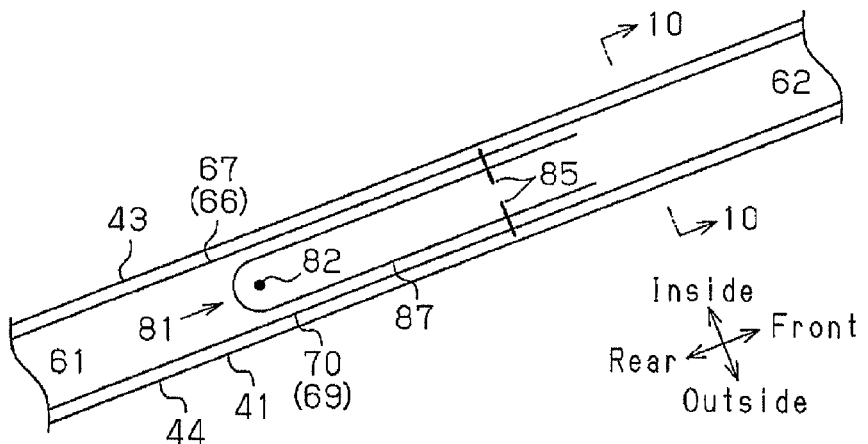
FIG. 9 is a local sectional view taken along line 9-9 in FIG. 4.

As shown in FIG. 6, the two main body cloth portions 43 and 44 are symmetric with respect to the bend line 42. The shape and size of each of the main body cloth portions 43 and 44 are set such that the airbag 41 covers a range from a low back PP to a shoulder PS of the passenger P when the airbag 41 deploys and inflates. A material having high strength and flexibility, such as woven cloth made of polyester yarn or polyamide yarn, is suitable for the main body cloth portions 43 and 44.

Margins of the two main body cloth portions 43 and 44 are joined along a margin joint 45. The margin joint 45 is formed by sewing together the whole margins of the two main body cloth portions 43 and 44 except for parts near the bend line 42. The same applies to outer joints 72, 84, and 85, inner joints 73 and 93, and joints 76 and 77.

In FIGS. 4 to 6, 11, and 17, a line having intermittently arranged thick lines of fixed length indicates a thread as seen from the side. An example of the line indicates the margin joint 45 in FIG. 4. A line having intermittently arranged thin lines of fixed length indicates a thread hidden behind a piece of cloth. An example of the line indicates the inner joint 93 in FIG. 5. A line having dots arranged at fixed intervals indicates sections of a thread at a sewn portion. An example of the line indicates the margin joint 45 in FIG. 5.

As shown in FIGS. 4 to 6, inflation gas is supplied into a space between the two main body cloth portions 43 and 44 which is surrounded by the margin joint 45. With this supply, the airbag 41 deploys and inflates at the side of the upper body of the passenger P. The space surrounded by the margin joint 45 is formed as an inflation portion 46 which restrains the upper body of the passenger P and protects the upper body of the passenger P from an impact. The margin joint 45 may be formed through means other than sewing using a thread and may be a portion bonded using adhesive. The same applies to the outer joints 72, 84, and 85, the inner joints 73 and 93, and the joints 76 and 77 (to be described later).

One pair of bolt holes 52 into which the bolts 34 are inserted are formed in the main body cloth portion 43. The two bolt holes 52 are arranged between a rear end of the airbag 41 and a longitudinal partition portion 81. More specifically, the bolt holes 52 are arranged between the bend line 42 and the outer joint 84 that is located at a position where the main body cloth portion 43 and the longitudinal partition portion 81 are joined. A reinforcing portion 53 is formed around each bolt hole 52 to prevent the main body cloth portion 43 from tearing. The reinforcing portion 53 is formed by sewing a portion around the bolt hole 52 of the main body cloth portion 43 with a thread.

As shown in FIGS. 5 and 6, an interior of the inflation portion 46 is partitioned into a plurality of chambers by a lateral partition portion 64 and the longitudinal partition portion 81. The lateral partition portion 64 and the longitudinal partition portion 81 each have a configuration similar to that of a tether. The lateral partition portion 64 is made of, e.g., woven cloth that is a material having high strength and flexibility. The lateral partition portion 64 is formed by folding one piece of cloth made of woven cloth in half along a central bend line 65. The lateral partition portion 64 is laid between lower portions of the two main body cloth portions 43 and 44. The lateral partition portion 64 may be formed from two pieces of cloth divided along the bend line 65. In order to distinguish between inside and outside overlaid portions of the lateral partition portion 64, an inside portion of the lateral partition portion 64 is referred to as a constituent cloth portion 66 while an outside portion of the lateral partition portion 64 is referred to as a constituent cloth portion 69.

The constituent cloth portion 66 includes a main body constituent cloth portion 67 and an extension portion 68. The main body constituent cloth portion 67 extends from a rear end to a front end of the main body cloth portion 43. The extension portion 68 extends downward from a rear end of the main body constituent cloth portion 67. The constituent cloth portion 69 includes a main body constituent cloth portion 70 and an extension portion 71. The main body constituent cloth portion 70 extends from a rear end to a front end of the main body cloth portion 44. The extension portion 71 extends downward from a rear end of the main body constituent cloth portion 70.

Figure 10:
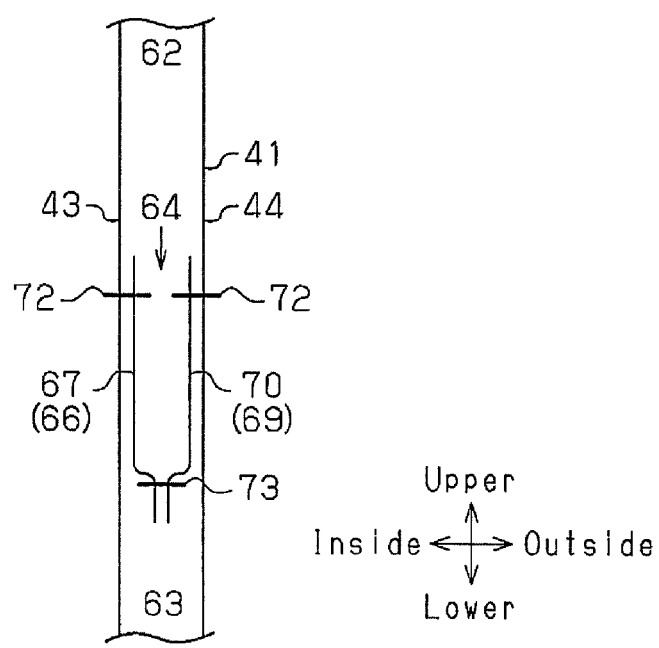
FIG. 10 is a local sectional view taken along line 10-10 in FIG. 9.
Figure 13:
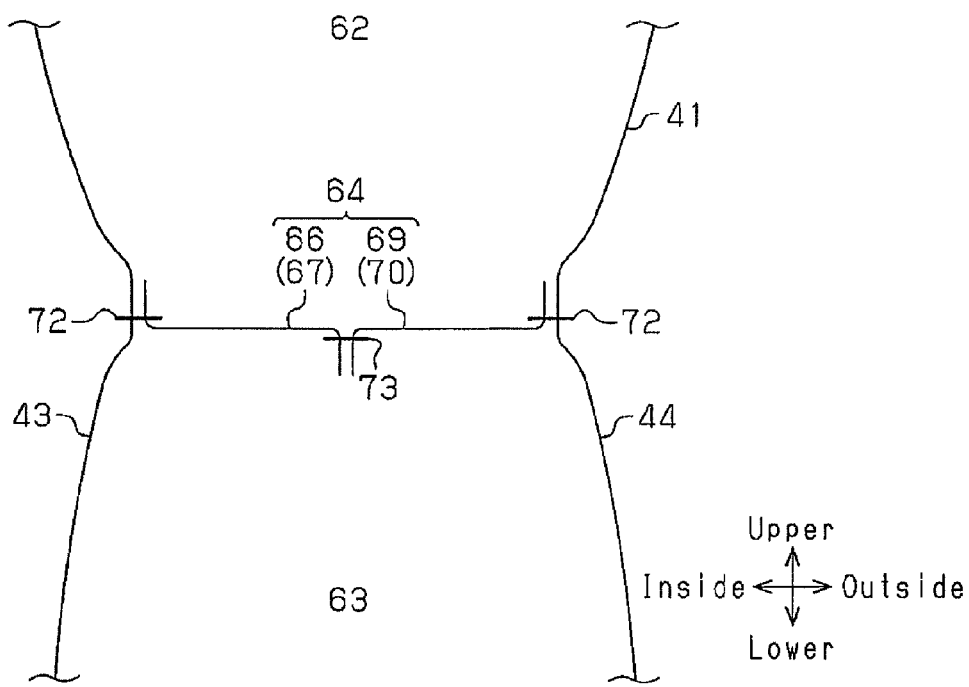
FIG. 13 is a schematic sectional view showing an interior of the airbag when a lateral partition portion is strained.

As shown in FIGS. 5, 10, and 13, the lateral partition portion 64 folded in halves is arranged between the two main body cloth portions 43 and 44 with the bend line 65 coinciding with the bend line 42. The outer joints 72 are formed at respective upper edges of the main body constituent cloth portions 67 and 70. The outer joint 72 of the main body constituent cloth portion 67 is joined to the main body cloth portion 43. The outer joint 72 of the main body constituent cloth portion 70 is joined to the main body cloth portion 44. Lower edges of the two main body constituent cloth portions 67 and 70 are joined to each other by the inner joints 73. Front ends of the two main body constituent cloth portions 67 and 70 are sewn to the front ends, respectively, of the two main body cloth portions 43 and 44 by the margin joint 45. A portion below the lateral partition portion 64 of the inflation portion 46 is a lower inflation chamber 63. The lower inflation chamber 63 deploys and inflates at the side of the low back PP of the passenger P. When the inflation portion 46 deploys and inflates, the lateral partition portion 64 is strained to restrict a lateral thickness of the inflation portion 46.

As shown in FIGS. 4, 5, 7, and 8, the longitudinal partition portion 81 is folded in halves along a bend line 82 between the two main body cloth portions 43 and 44. An upper end of the longitudinal partition portion 81 folded in halves is sewn to upper ends of the two main body cloth portions 43 and 44 by the margin joint 45. A lower end of the longitudinal partition portion 81 folded in halves is arranged between the two constituent cloth portions 66 and 69 of the lateral partition portion 64 and is overlaid on the two main body constituent cloth portions 67 and 70. The lower end of the longitudinal partition portion 81 folded in halves is sewn to the two main body constituent cloth portions 67 and 70 of the lateral partition portion 64 by the inner joints 73.

As shown in FIGS. 5 to 9, the longitudinal partition portion 81 has a longitudinal dimension along the bend line 82 and a lateral dimension orthogonal to the bend line 82 when the longitudinal partition portion 81 is developed. The longitudinal dimension of the longitudinal partition portion 81 is larger than the lateral dimension of the longitudinal partition portion 81. The outer joints 84 and the outer joints 85 are formed at margins of the longitudinal partition portion 81. The longitudinal partition portion 81 is joined to the main body cloth portions 43 and 44 by the outer joints 84 in an area where the longitudinal partition portion 81 does not overlap with the two main body constituent cloth portions 67 and 70. The longitudinal partition portion 81 is joined to the main body constituent cloth portions 67 and 70 by the outer joints 85 in an area where the longitudinal partition portion 81 overlaps with the two main body constituent cloth portions 67 and 70. When the airbag 41 is folded in halves, and the two main body cloth portions 43 and 44 are overlaid on top of each other, the outer joints 84 fit together while the outer joints 85 fit together.

Figure 11:
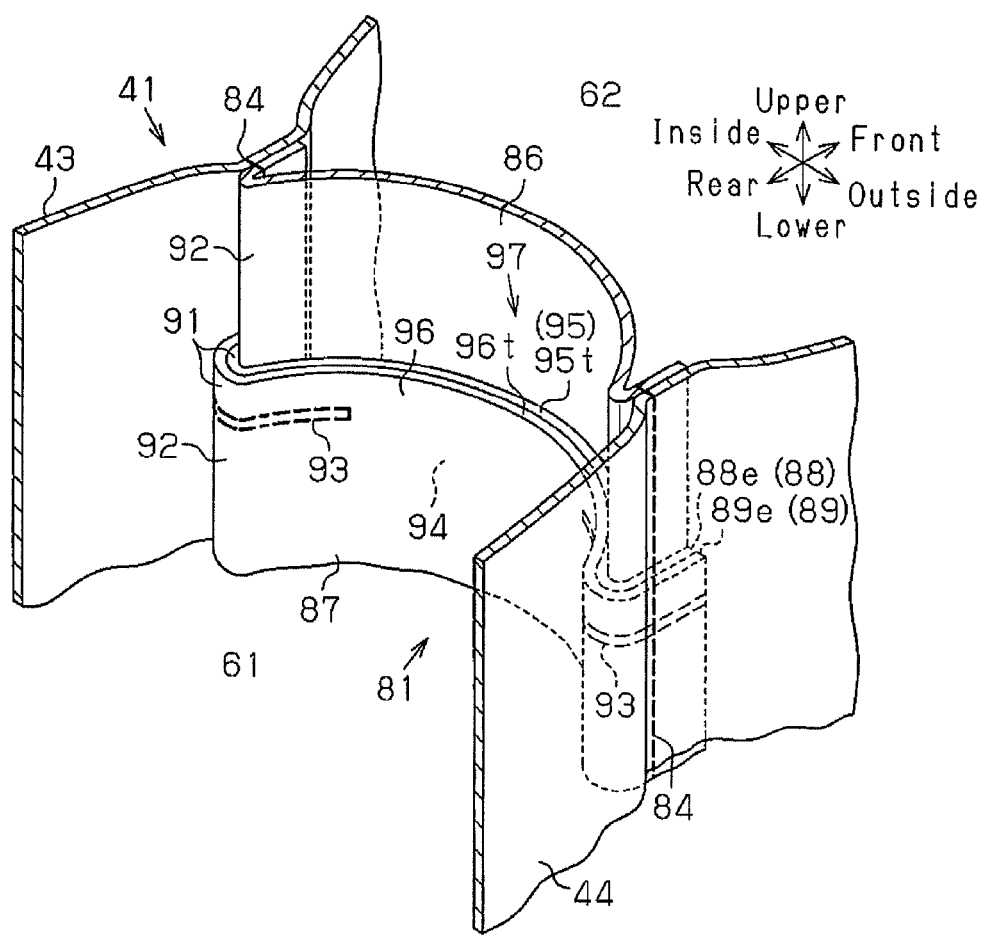
FIG. 11 is a fragmentary perspective view showing a pressure regulating valve and a portion around the pressure regulating valve when a longitudinal partition portion is strained.

As described above, the longitudinal partition portion 81 is laid between the two main body cloth portions 43 and 44. When the airbag 41 is in a non-inflated and deployed state, the longitudinal partition portion 81 is folded in halves. If a rear inflation chamber 61 inflates, as shown in FIG. 11, the longitudinal partition portion 81 becomes strained in the lateral direction to restrict a lateral inflation thickness of the rear inflation chamber 61. When inflation of the airbag 41 is completed, the longitudinal partition portion 81 is located between a front surface of the seat back 14 and a front end of a chest PT of the passenger P.

As shown in FIG. 5, since the longitudinal partition portion 81 is arranged at the above-described position, the rear inflation chamber 61 deploys and inflates at the side of the shoulder PS and at the side of a rear half of the chest PT. The rear inflation chamber 61 is a portion above the lateral partition portion 64 of the inflation portion 46 and behind the longitudinal partition portion 81. A front inflation chamber 62 deploys and inflates at the side of a front half of the chest PT. The front inflation chamber 62 is a portion above the lateral partition portion 64 of the inflation portion 46 and in front of the longitudinal partition portion 81.

As shown in FIGS. 6 and 11, the longitudinal partition portion 81 is composed of two pieces 86 and 87 of cloth which are arranged in a vertical direction. The two pieces 86 and 87 of cloth are made of a material having high strength and flexibility, such as woven cloth. End portions 88 and 89 of the pieces 86 and 87 of cloth are overlaid on top of each other in a strip shape with their end edges 88e and 89e coinciding with each other. The inner joints 93 that extend in the lateral direction are provided at a boundary between overlapping portions 91 of the pieces 86 and 87 of cloth and non-overlapping portions 92 which are portions excluding the overlapping portions 91. The pieces 86 and 87 of cloth are joined to each other by the inner joints 93. At least one of the upper piece 86 of cloth and the lower piece 87 of cloth constituting the longitudinal partition portion 81 may be divided into two along the bend line 82.

Figure 14A:
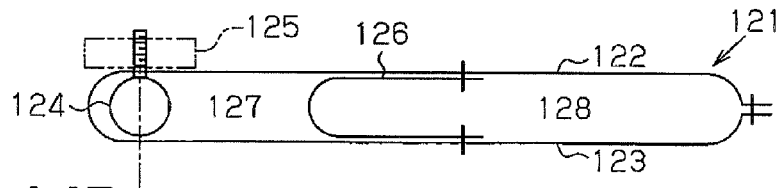
FIG. 14A is a schematic sectional view showing the respective positions of an inflator and a longitudinal partition portion in an airbag which is not inflated according to the prior art.
Figure 14B:
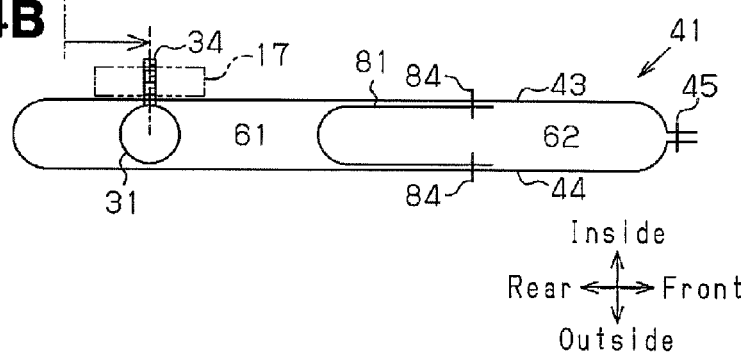
FIG. 14B is a schematic sectional view showing the respective positions of an inflator and the longitudinal partition portion in the airbag that is not inflated according to the first embodiment.

As shown in FIGS. 5 and 14B, the inflator 31 is longitudinally housed in the rear inflation chamber 61 and is arranged between the bend line 42 of the airbag 41 and the longitudinal partition portion 81. The bolts 34 are inserted into the bolt holes 52 of the main body cloth portion 43 and fix the inflator 31 to the airbag 41. In this state, the gas jetting portion 31a is arranged at a rear portion of the rear inflation chamber 61 and in the vicinity of the lower inflation chamber 63. An opening portion 74 and a non-return valve 75 are provided at the lateral partition portion 64. A communication hole 94 and a pressure regulating valve 97 are provided at the longitudinal partition portion 81.

As shown in FIGS. 5 and 6, the lower inflation chamber 63 communicates with the rear inflation chamber 61 through the opening portion 74. The main body constituent cloth portions 67 and 70 are not joined by the inner joints 73 to the lateral partition portion 64 at rear portions thereof. That is, the inner joints 73 are not provided near the bend line 65. As described above, a portion without the inner joints 73 in the inflation portion 46 is constructed as the opening portion 74.

The non-return valve 75 is a valve which controls circulation of inflation gas through the opening portion 74. The non-return valve 75 allows inflow of inflation gas from the rear inflation chamber 61 into the lower inflation chamber 63 but restricts inflow of inflation gas from the lower inflation chamber 63 into the rear inflation chamber 61. Front margins of the two extension portions in a half-folded state are joined to each other by the joints 76. Upper ends of the joints 76 are linked to rear ends of the inner joints 73. The joints 77 are provided at rear margins of the two extension portions 68 and 71. Rear portions of the two extension portions 68 and 71 in a half-folded state are joined to each other by the joints 77.

The two extension portions 68 and 71 in a half-folded state are sewn by the margin joint 45 to the two main body cloth portions 43 and 44 at portions behind the joints 77. The inside extension portion 68 constitutes an inside valve body portion 78 of the non-return valve 75. The outside extension portion 71 constitutes an outside valve body portion 79 of the non-return valve 75. The valve body portions 78 and 79 are portions which are surrounded by the opening portion 74 and the two joints 76 and 77. The non-return valve 75 allows circulation of inflation gas and is opened when the two valve body portions 78 and 79 are separated from each other. The non-return valve 75 restricts circulation of inflation gas and is closed when parts of the two valve body portions 78 and 79 come into contact with each other.

As shown in FIGS. 5 and 11, the communication hole 94 and the pressure regulating valve 97 are formed substantially at the center of the longitudinal partition portion 81. At the boundary between the overlapping portions 91 and the non-overlapping portions 92, the inner joint 93 is not provided near the bend line 82. A portion without the inner joint 93 in which the two pieces 86 and 87 of cloth are not joined is constructed as the communication hole 94 that brings the rear inflation chamber 61 and the front inflation chamber 62 into communication. The communication hole 94 is composed of a slit which extends in the lateral direction.

Figures 12A, 12B, 12C:
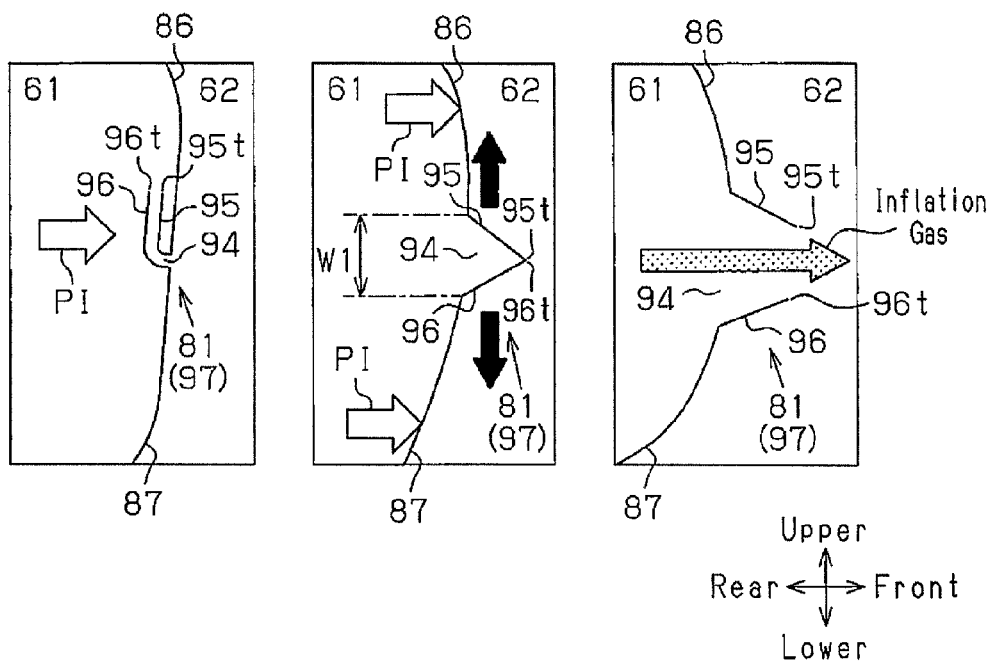
FIGS. 12A to 12C are schematic sectional views showing the operation of the pressure regulating valve.

The pressure regulating valve 97 controls circulation of inflation gas through the communication hole 94, thereby regulating respective internal pressures of the rear inflation chamber 61 and the front inflation chamber 62. A wall surface of the communication hole 94 and the end edge 88e constitute a valve body portion 95 of the pressure regulating valve 97. A wall surface of the communication hole 94 and the end edge 89e constitute a valve body portion 96 of the pressure regulating valve 97. When distal ends 95t and 96t of the two valve body portions 95 and 96 come into contact, as shown in FIGS. 12A and 12B, circulation of inflation gas between the two valve body portions 95 and 96 is restricted, and the pressure regulating valve 97 is closed. On the other hand, when the communication hole 94 is opened, and the valve body portion 95 is separated from the valve body portion 96, as shown in FIG. 12C, circulation of inflation gas between the two valve body portions 95 and 96 is allowed, and the pressure regulating valve 97 is opened.

After the overlapping portions 91 are bent upward or downward at the boundary between the overlapping portions 91 and the non-overlapping portions 92, the overlapping portions 91 are overlaid on the non-overlapping portion 92. In the first embodiment, the overlapping portions 91 are bent upward. While the overlapping portions 91 are bent, two ends of the two overlapping portions 91 are sewn to the main body cloth portions 43 and 44 of the airbag 41 and the non-overlapping portions 92 by the outer joints 84.

As shown in FIG. 3, the airbag module AM is housed in the car seat 12 after the airbag module AM is made compact by folding the airbag 41 in a non-inflated and deployed state. The airbag 41 is folded to store the airbag module AM in the storage portion 21 of limited size of the seat back 14. The bolts 34 of the airbag module AM extend from the retainer 32, penetrate the airbag 41, and are inserted into the side frame 17. After that, the bolts 34 are fastened with nuts 35. In this manner, the inflator 31 is attached to the side frame 17 together with the airbag 41. The airbag 41 is attached to the side frame 17 at a position between the rear end of the main body cloth portion 43 and the longitudinal partition portion 81, more specifically between the bend line 82 and the outer joint 84. The inflator 31 may be attached to the side frame 17 with a member different from the bolts 34 and the nuts 35. Alternatively, the retainer 32 may be omitted, and the inflator 31 may be directly attached to the side frame 17.

As shown in FIGS. 1 and 2, the side airbag apparatus includes an impact sensor 101 and a control device 102. The impact sensor 101 is composed of an acceleration sensor and is provided at the side wall portion 11 of the car 10. The impact sensor 101 detects an impact given from the side to the side wall portion 11. The control device 102 controls actuation of the inflator 31 on the basis of a detection signal from the impact sensor 101. The car 10 is equipped with a seatbelt apparatus to restrain the passenger P in the car seat 12.

Action of the side airbag apparatus according to the first embodiment will be described.

An actuation signal for actuating the inflator 31 is not output from the control device 102 unless an impact is given to the side wall portion 11 due to, e.g., a side crash. For this reason, inflation gas is not jetted from the inflator 31. As shown in FIG. 3, the airbag 41 continues to be stored in the storage portion 21 in a form suitable for storage.

When an impact not less than a predetermined value is given to the side wall portion 11 during traveling of the car 10, the impact sensor 101 detects the impact. The control device 102 then outputs an actuation signal for actuating the inflator 31 on the basis of a detection signal from the impact sensor 101. Inflation gas is jetted from the gas jetting portion 31a of the inflator 31 in response to the actuation signal. When the inflation gas is supplied to the rear inflation chamber 61 through the window 33 of the retainer 32, as shown in FIG. 5, inflation of the rear inflation chamber 61 is started.

Inflation gas jetted from the open end 32a on the lower side of the retainer 32 flows toward the non-return valve 75. During passage of the inflation gas through the non-return valve 75, the two valve body portions 78 and 79 inflate cylindrically. For this reason, the inflation gas passes through the opening portion 74 and between the two valve body portions 78 and 79 and flows into the lower inflation chamber 63. This starts inflation of the lower inflation chamber 63. The lateral partition portion 64 is pulled in the lateral direction by the inflating rear inflation chamber 61 and lower inflation chamber 63. The supply of the inflation gas from the inflator 31 gradually raises an internal pressure of the lower inflation chamber 63.

The longitudinal partition portion 81 folded in halves is pulled in the lateral direction by the inflating rear inflation chamber 61. An internal pressure PI of the rear inflation chamber 61 is applied to the two valve body portions 95 and 96 in a thickness direction, as shown in FIG. 12A. Since this application brings the two whole valve body portions 95 and 96 into close contact with each other, circulation of inflation gas between the two valve body portions 95 and 96 is restricted. The overlapping portions 91 are pushed against the non-overlapping portion 92 in the longitudinal partition portion 81, as shown in FIG. 11, and the two valve body portions 95 and 96 are more tightly closed.

As described above, the longitudinal dimension of the longitudinal partition portion 81 is larger than the lateral dimension. Tension acting in the lateral direction tends to be higher than tension acting in the longitudinal direction in the longitudinal partition portion 81, and the communication hole 94 extends in the lateral direction, in which tension is more likely to act. This makes the two valve body portions 95 and 96 more likely to be closed. Additionally, since the two ends of the overlapping portions 91 are joined to the main body cloth portions 43 and 44, high tension acts from the main body cloth portions 43 and 44 on the overlapping portions 91 in the lateral direction when the rear inflation chamber 61 deploys and inflates.

When the two valve body portions 95 and 96 come into contact with each other, the pressure regulating valve 97 is closed. Inflation gas inside the rear inflation chamber 61 then stops flowing out into the front inflation chamber 62 through a gap between the two valve body portions 95 and 96 and through the communication hole 94. Inflation gas raises only the internal pressure of the rear inflation chamber 61.

A portion above the lateral partition portion 64 of the inflation portion 46 is partitioned into the rear inflation chamber 61 and the front inflation chamber 62 by the longitudinal partition portion 81. For this reason, the volume of the rear inflation chamber 61 is smaller than that of the portion when the portion is not partitioned by the longitudinal partition portion 81. The internal pressure of the rear inflation chamber 61 rises and becomes high earlier. At this time, the inflation portion 46 is not yet in contact with the passenger P. After that, the rear inflation chamber 61 and the lower inflation chamber 63 inflate while deploying in reverse order to how the rear inflation chamber 61 and the lower inflation chamber 63 are folded. The seat pad 18 of the seat back 14 is pressed by the two inflation chambers 61 and 63 to fracture at the portion 23 to be fractured. The rear inflation chamber 61 and the lower inflation chamber 63 come out forward from a spot of fracture of the seat pad 18 while parts thereof are left in the storage portion 21.

As shown in FIGS. 1 and 2, after that, inflation gas continues to be supplied to the rear inflation chamber 61. The rear inflation chamber 61 deploys and inflates forward through a gap between the shoulder PS and the rear half of the chest PT and the side wall portion 11. When inflation gas continues to be supplied to the lower inflation chamber 63, the lower inflation chamber 63 deploys and inflates forward through a gap between the low back PP and the side wall portion 11. At this time, the front inflation chamber 62 is not yet inflated or is slightly inflated. The internal pressure of the front inflation chamber 62 is still low.

As shown in FIG. 11, when the longitudinal partition portion 81 is pulled in the lateral direction, the longitudinal partition portion 81 becomes strained to restrict an inflation thickness T1 of the rear inflation chamber 61. As shown in FIG. 13, when the lateral partition portion 64 is pulled in the lateral direction, the lateral partition portion 64 becomes strained to restrict lateral inflation thicknesses of the rear inflation chamber 61 and the lower inflation chamber 63. When the side wall portion 11 moves deeper inside, the shoulder PS of the passenger P starts being pressed inward by the rear inflation chamber 61. The shoulder PS and the rear half of the chest PT are pressed by the rear inflation chamber 61, and the low back PP is pressed by the lower inflation chamber 63. In this manner, the passenger P is moved inward and restrained. Extension of the distance between the passenger P and the side wall portion 11 secures a space for the front inflation chamber 62 to deploy and inflate. At this time, only the rear inflation chamber 61 is deployed and inflated above the lateral partition portion 64 of the inflation portion 46. The passenger P thus receives pressure only from the rear inflation chamber 61 of the inflation portion 46.

While inflation gas continues to be supplied into the rear inflation chamber 61 with the two whole valve body portions 95 and 96 in close contact, external force applied from the side wall portion 11 starts opening the pressure regulating valve 97. That is, the external force that restrains the passenger P starts deforming the inflation portion 46 in the middle of the supply of inflation gas to the rear inflation chamber 61. This reduces the lateral tension acting on the longitudinal partition portion 81 and increases the longitudinal tension. When the inflation portion 46 is deformed as described above, the internal pressure PI of the rear inflation chamber 61 rises further. As shown in FIG. 12B, the longitudinal partition portion 81 is pressed toward the front inflation chamber 62. For this reason, tension of the longitudinal partition portion 81 changes so as to reduce the difference between the longitudinal tension and the lateral tension. As a result, the communication hole 94 is deformed, and the valve body portions 95 and 96 start moving.

As described above, the overlapping portions 91 are overlaid on the non-overlapping portion 92, and the two ends of the overlapping portions 91 are joined to the main body cloth portions 43 and 44, respectively, by the outer joints 84. For this reason, the overlapping portions 91 are kept overlaid on the non-overlapping portion 92 near each outer joint 84 by a relatively strong force. The force decreases from the outer joint 84 toward centers of the overlapping portions 91 and is at a minimum near the two valve body portions 95 and 96. The overlapping portions 91 are thus likely to be deformed in the vicinity of the valve body portions 95 and 96 when the overlapping portions 91 are pulled in the longitudinal direction.

As shown in FIG. 12B, when the communication hole 94 opens to some degree in the longitudinal direction, the two valve body portions 95 and 96 under the high internal pressure PI of the rear inflation chamber 61 are pushed out into the front inflation chamber 62 through the communication hole 94. If a longitudinal width W1 of the communication hole 94 is small, the distal ends 95t and 96t of the two valve body portions 95 and 96 come into contact to close the pressure regulating valve 97. If the width W1 of the communication hole 94 increases, as shown in FIG. 12C, the distal ends 95t and 96t of the two valve body portions 95 and 96 are separated to open the pressure regulating valve 97. Inflation gas inside the rear inflation chamber 61 passes through the communication hole 94 and between the two valve body portions 95 and 96 and flows out into the front inflation chamber 62.

When the inflation gas flows out into the front inflation chamber 62, the internal pressure of the rear inflation chamber 61 starts falling. Even at this time, the side wall portion 11 still continues to come inside. For this reason, the rear inflation chamber 61 of the inflation portion 46 is pushed against the passenger P. In the meantime, the front inflation chamber 62 starts inflating, and the internal pressure of the front inflation chamber 62 starts rising. The front inflation chamber 62 starts deploying in reverse order to how the front inflation chamber 62 is folded. At this time, the front inflation chamber 62 deploys and inflates at an internal pressure lower than that of the rear inflation chamber 61. The front inflation chamber 62 deploys and inflates at the side of the front half of the chest PT lower in impact resistance than the shoulder PS. At this time, the distance between the side wall portion 11 and the upper body of the passenger P is extended by the rear inflation chamber 61 and the lower inflation chamber 63, as described above. The front inflation chamber 62 is thus likely to deploy forward.

A little later than the start of the rise in the internal pressure of the front inflation chamber 62, the side wall portion 11 coming inside causes the front inflation chamber 62 together with the rear inflation chamber 61 to come into contact with the upper body of the passenger P and push the upper body of the passenger P. The upper body of the passenger P is restrained by the rear inflation chamber 61 and the front inflation chamber 62. The airbag 41 intervening between the upper body of the passenger P and the side wall portion 11 presses the upper body of the passenger P inward and restrains the upper body of the passenger P. As a result, an impact given from the side wall portion 11 is mitigated by the inflation portion 46. In the above-described manner, the upper body of the passenger P is protected.

As shown in FIG. 5, when inflation gas stops jetting from the inflator 31, inflation gas inside the lower inflation chamber 63 tries to flow toward the rear inflation chamber 61. Under high pressure inside the lower inflation chamber 63, the two valve body portions 78 and 79 of the non-return valve 75 are pressed so as to come into contact with each other. When the non-return valve 75 is closed in this manner, a backward flow of the inflation gas in the lower inflation chamber 63 into the rear inflation chamber 61 is restricted. The internal pressure of the lower inflation chamber 63 is thus kept at a high pressure suitable for protection of the low back PP of the passenger P.

Even after that, the non-return valve 75 allows inflow of inflation gas from the rear inflation chamber 61 into the lower inflation chamber 63 and restricts a backward flow from the lower inflation chamber 63 into the rear inflation chamber 61. For this reason, even if the airbag 41 restrains the low back PP of the passenger P to raise the internal pressure of the lower inflation chamber 63, the non-return valve 75 restricts a backward flow of inflation gas from the lower inflation chamber 63 into the rear inflation chamber 61. That is, the low back PP that is a part with high impact resistance is effectively restrained by the lower inflation chamber 63 with high internal pressure and is protected from an impact. Even if the pressure of the lower inflation chamber 63 changes in association with the restraint of the low back PP, the internal pressure of the rear inflation chamber 61 is inhibited from rising by the non-return valve 75.

Figure 15A:
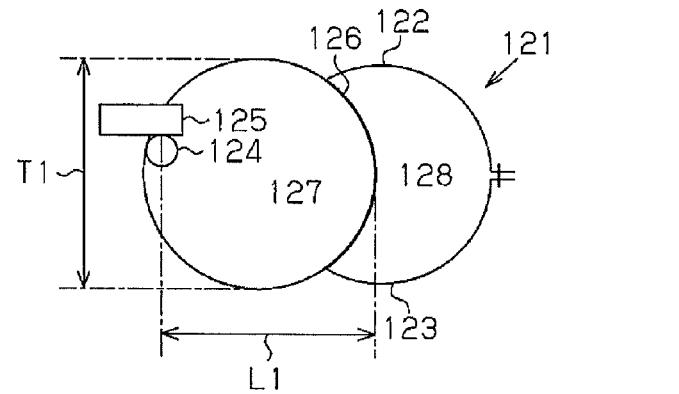
FIG. 15A is a schematic sectional view showing the respective positions of the inflator and the longitudinal partition portion in the airbag that is inflated according to the prior art.
Figure 15B:
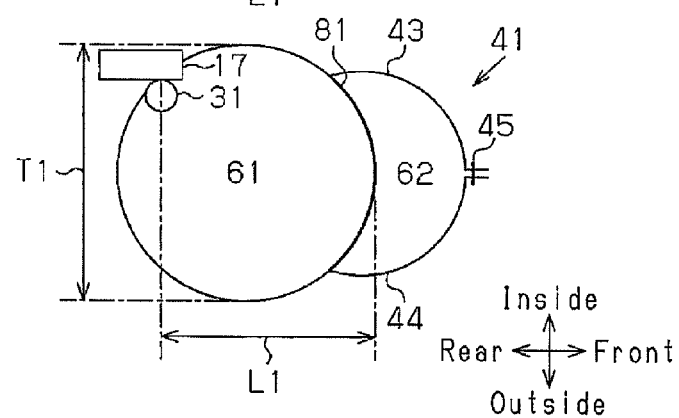
FIG. 15B is a schematic sectional view showing the respective positions of the inflator and the longitudinal partition portion in the airbag that is inflated according to the first embodiment.

FIG. 14A and FIG. 14B show the respective positions of the inflator 124 and the longitudinal partition portion 126 in the airbag 121 that is not inflated according to the prior art and the respective positions of the inflator 31 and the longitudinal partition portion 81 in the airbag 41 that is not inflated according to the first embodiment, respectively. FIG. 15A and FIG. 15B show the respective positions of the inflator 124 and the longitudinal partition portion 126 in the airbag 121 that is inflated according to the prior art and the respective positions of the inflator 31 and the longitudinal partition portion 81 in the airbag 41 that is inflated according to the first embodiment, respectively.

In the first embodiment, the inflator 31 is arranged between the rear end of the airbag 41 and the longitudinal partition portion 81. The inflator 31 is attached to the side frame 17 by the bolts 34 together with the main body cloth portion 43. That is, the airbag 41 is attached to the side frame 17 through the inflator 31 at the position between the rear end of the main body cloth portion 43 and the longitudinal partition portion 81. A position of attachment of the inflator 31 to the side frame 17 coincides with a position of attachment of the airbag 41 to the side frame 17.

The rear inflation chamber 61 inflates both in front of and behind the position of attachment of the airbag 41 to the side frame 17. Thus, even in a case where the position of the longitudinal partition portion 126 is shifted forward to increase the inflation thickness T1 of the rear inflation chamber 127 shown in FIG. 15A, the above-described conventional problem is solved. That is, as shown in FIG. 15B, the rear inflation chamber 61 may be inflated behind the position of attachment of the airbag 41 to the side frame 17 by a distance by which the position of the longitudinal partition portion 126 is shifted. In this case, a length L1 from the position of attachment of the airbag 41 to the side frame 17 to a front end of the rear inflation chamber 61 is about equal to the length L1 from the position of attachment of the airbag 121 to the seat frame 125 to the front end of the rear inflation chamber 127.

As shown in FIG. 14B, the inflator 31 is locked to the side frame 17 between the rear end of the main body cloth portion 43 and the longitudinal partition portion 81. In this case, a length from a spot of locking of the inflator 31 to the outer joint 84 that is a spot of joining of the longitudinal partition portion 81 and the main body cloth portion 44 in the airbag 41 is regarded as a circumferential length on the car exterior side. A length from the spot of locking of the inflator 31 to the outer joint 84 that is a spot of joining of the longitudinal partition portion 81 and the main body cloth portion 43 in the airbag 41 is regarded as a circumferential length on the car interior side. The circumferential length on the car exterior side is larger than the circumferential length on the car interior side.

The airbag 41 inflates forward on the whole, and a portion behind the spot of locking of the inflator 31 in the airbag 41 is pulled forward. In this case, since the circumferential length on the car exterior side is larger than the circumferential length on the car interior side, as described above, the spot of joining of the longitudinal partition portion 81 and the main body cloth portion 44 is located in front of the spot of joining of the longitudinal partition portion 81 and the main body cloth portion 43. The two spots of joining are located between the front surface of the seat back 14 and the front end of the chest PT of the passenger P.

As has been described above, according to the first embodiment, the advantages below can be achieved.

Figure 20A:
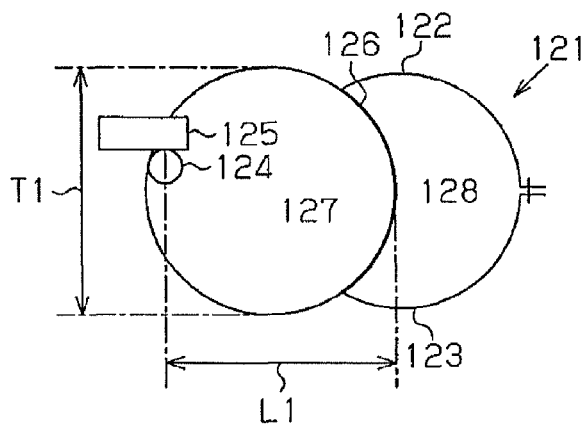
FIG. 20A is a schematic sectional view showing the respective positions of the inflator and the longitudinal partition portion in the airbag that is inflated according to the prior art.
Figure 20B:
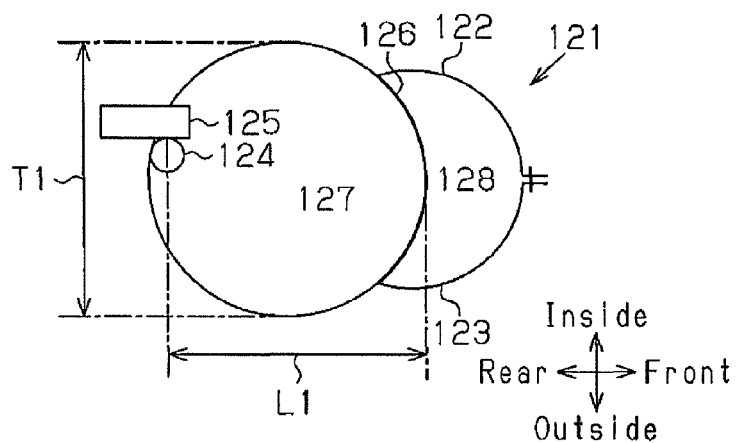
FIG. 20B is a schematic sectional view showing the respective positions of the inflator and the longitudinal partition portion in the airbag that is not inflated according to the prior art.

(1) The airbag 41 is attached to the side frame 17 at the position between the rear end of the main body cloth portion 43 and the longitudinal partition portion 81. With this configuration, as shown in FIGS. 15A and 15B, the inflation thickness T1 of the rear inflation chamber 61 can be increased without changing the length L1 from the position of attachment to the side frame 17 to the front end of the rear inflation chamber 61 in the airbag 41. That is, an amount by which the rear inflation chamber 127 protrudes can be prevented from increasing due to change in the length L1, as shown in FIGS. 20A and 20B. It is thus possible to keep the capability of restraining the passenger P and the capability of protecting the passenger P high through use of the airbag. It is also possible to set the inflation thickness T1 of the rear inflation chamber 61 to an optimal value.

(2) The inflator 31 is arranged between the rear end of the airbag 41 and the longitudinal partition portion 81 inside the airbag 41. The bolt holes 52 are formed between the bend line 42 and the longitudinal partition portion 81 in the main body cloth portion 43. The inflator 31 is locked to the airbag 41 with the bolts 34 inserted in the bolt holes 52. The bolts 34 inserted in the side frame 17 are fastened with the nuts 35, thereby attaching the inflator 31 to the side frame 17 together with the airbag 41. As described above, since the position of attachment of the inflator 31 to the side frame 17 and the position of attachment of the airbag 41 to the side frame 17 coincide with each other, the advantage (1) above can be achieved. Since the positions of the bolt holes 52 are only changed, the airbag 41 has a simple configuration and can be easily manufactured.

(3) In a side airbag apparatus of the prior art, a longitudinal partition portion is joined to a portion intermediate in a front-back direction of an inside main body cloth portion. The longitudinal partition portion is joined to a rear end of an outside main body cloth portion. For this reason, when an airbag inflates, the longitudinal partition portion is pulled obliquely, and a joint of the longitudinal partition portion and the inside main body cloth portion is separated forward from a joint of the longitudinal partition portion and the outside main body cloth portion. An inflation thickness of a rear inflation chamber is larger in an oblique direction than in a lateral direction. The rear inflation chamber thus cannot be greatly inflated in the lateral direction. Additionally, communication holes formed in the longitudinal partition portion incline greatly in the lateral direction. For this reason, inflation gas inside the rear inflation chamber passes through the communication holes and flows in a direction away from a passenger. The capability of restraining a passenger of the front inflation chamber is thus low.

In contrast, in the first embodiment, when the airbag 41 completes inflation, the longitudinal partition portion 81 is located between the front surface of the seat back 14 and the front end of the chest PT of the passenger P. For this reason, at the time of inflation of the airbag 41, an angle of inclination of the longitudinal partition portion 81 is smaller than that of the prior art, and the longitudinal partition portion 81 does not incline greatly in the lateral direction. Thus, the inflation thickness of the rear inflation chamber 61 does not increase in an oblique direction. The rear inflation chamber 61 can thus be greatly inflated in the lateral direction. Additionally, the communication hole 94 formed in the longitudinal partition portion 81 does not incline greatly in the lateral direction. Inflation gas inside the rear inflation chamber 61 does not flow away from the passenger P after passing through the communication hole 94. Thus, the capability of restraining the passenger P of the front inflation chamber 62 is improved.

Second Embodiment

A second embodiment of a side airbag apparatus will be described with reference to FIGS. 16A and 16B.

Figure 16A:
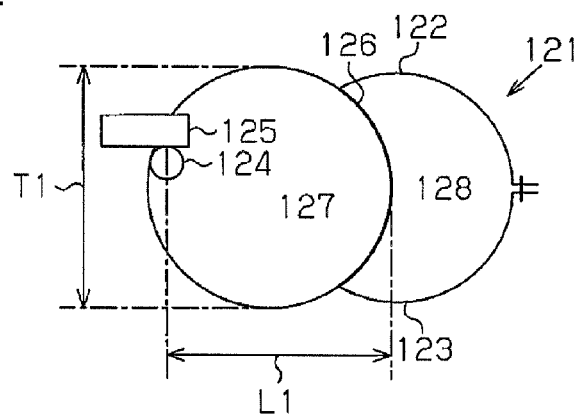
FIG. 16A is a schematic sectional view showing the respective positions of the inflator and the longitudinal partition portion in the airbag that is inflated according to the prior art.
Figure 16B:
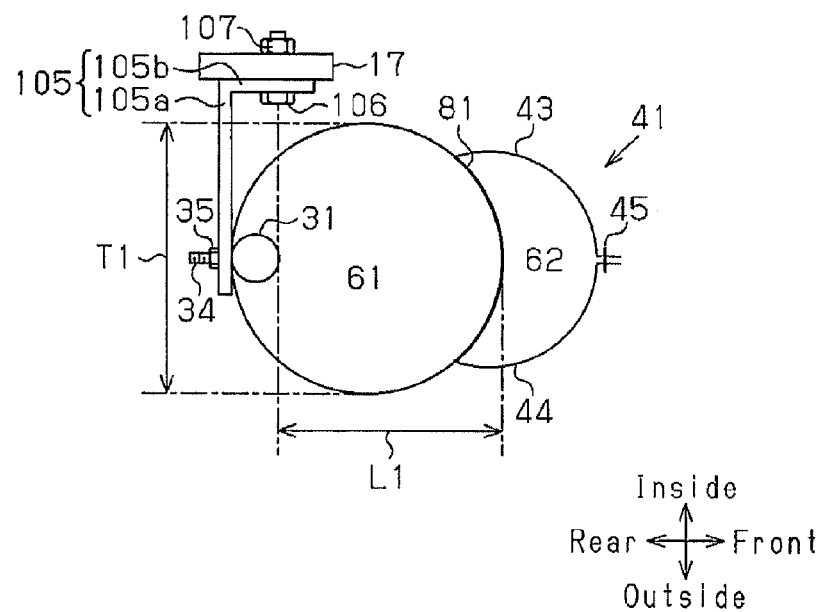
FIG. 16B is a schematic sectional view showing the respective positions of an inflator and a longitudinal partition portion in an airbag which is inflated according to a second embodiment of the present invention.

FIG. 16A and FIG. 16B show the respective positions of the inflator 124 and the longitudinal partition portion 126 in the airbag 121 that is inflated according to the prior art and the respective positions of an inflator 31 and a longitudinal partition portion 81 in an airbag 41 which is inflated according to a second embodiment, respectively. As shown in FIG. 16B, the inflator 31 is attached to a side frame 17 via a bracket 105.

The bracket 105 includes a rear wall portion 105a and a side wall portion 105b. The rear wall portion 105a extends in a lateral direction behind the airbag 41. The side wall portion 105b extends forward from an inner end of the rear wall portion 105a. The bracket 105 is substantially T-shaped in plan view. The side wall portion 105b is attached to the side frame 17 with a bolt 106 and a nut 107. The side wall portion 105b is attached to the side frame 17 at a position between a rear end of a main body cloth portion 43 and the longitudinal partition portion 81.

The inflator 31 is arranged at a rear end of the airbag 41 inside the airbag 41. The inflator 31 is locked to the airbag 41 with a bolt 34 and a nut 35 and is attached to the rear wall portion 105a of the bracket 105. In this manner, the airbag 41 is attached to the side frame 17 at a position between the rear end of the main body cloth portion 43 and the longitudinal partition portion 81. In this case, a position of attachment of the inflator 31 to the bracket 105 is different from a position of attachment of the airbag 41 to the side frame 17. The rear end of the airbag 41 includes a portion on or in the vicinity of a bend line 42.

Thus, a rear inflation chamber 61 can inflate not only in front of but also behind a position of attachment of the bracket 105 to the side frame 17. The rear inflation chamber 61 inflates only in front of the position of attachment of the inflator 31 to the bracket 105. For this reason, even in a case where the position of the longitudinal partition portion 126 is shifted forward to increase the inflation thickness T1 of the rear inflation chamber 127 shown in FIG. 16A, the above-described conventional problem is solved. That is, as shown in FIG. 16B, the position of attachment of the bracket 105 may be set so as to inflate the rear inflation chamber 61 behind the position of attachment of the bracket 105 to the side frame 17 by a distance by which the position of the longitudinal partition portion 126 is shifted. With this configuration, a length L1 from the position of attachment of the airbag 41 to the side frame 17 to a front end of the rear inflation chamber 61 is maintained without change.

The inflator 31 is arranged at the rear end of the airbag 41 and is locked to the airbag 41 in the vicinity of the bend line 42. In this case, unlike the first embodiment, a length from a spot of locking of the inflator 31 to a spot of joining of the longitudinal partition portion 81 and a main body cloth portion 44 in the airbag 41 is regarded as a circumferential length on the car exterior side. A length from the spot of locking of the inflator 31 to a spot of joining of the longitudinal partition portion 81 and the main body cloth portion 43 in the airbag 41 is regarded as a circumferential length on the car interior side. The circumferential length on the car exterior side is substantially equal to the circumferential length on the car interior side. For this reason, while the airbag 41 is inflated, and the longitudinal partition portion 81 is strained, the spot of joining of the longitudinal partition portion 81 and the main body cloth portion 44 is located at the side of the spot of joining of the longitudinal partition portion 81 and the main body cloth portion 43. In this case as well, the two spots of joining are located between a front surface of a seat back 14 and a front end of a chest PT of a passenger P.

Thus, according to the second embodiment, the advantages below can be achieved, instead of the advantage (2) above.

(4) The bracket 105 is attached to the side frame 17 at the position between the rear end of the airbag 41 and the longitudinal partition portion 81. The inflator 31 is arranged at the rear end of the airbag 41 inside the airbag 41. The inflator 31 is also locked to the airbag 41 with the bolt 34 and is attached to the rear wall portion 105a of the bracket 105. According to this configuration, the airbag 41 can be attached to the side frame 17 at the position between the rear end of the main body cloth portion 43 and the longitudinal partition portion 81 through use of the bracket 105. As a result, the same advantage as (1) above can be achieved.

(5) The bracket 105 includes the rear wall portion 105a and the side wall portion 105b. The side wall portion 105b is attached to the side frame 17, and the inflator 31 is attached to the rear wall portion 105a. This configuration allows simplification of the structure of the bracket 105.

Third Embodiment

A third embodiment of a side airbag apparatus will be described with reference to FIGS. 17 and 18. A side airbag apparatus according to the third embodiment is different from that in the first embodiment in that the side airbag apparatus does not have the non-return valve 75 and the pressure regulating valve 97.

Figure 17:
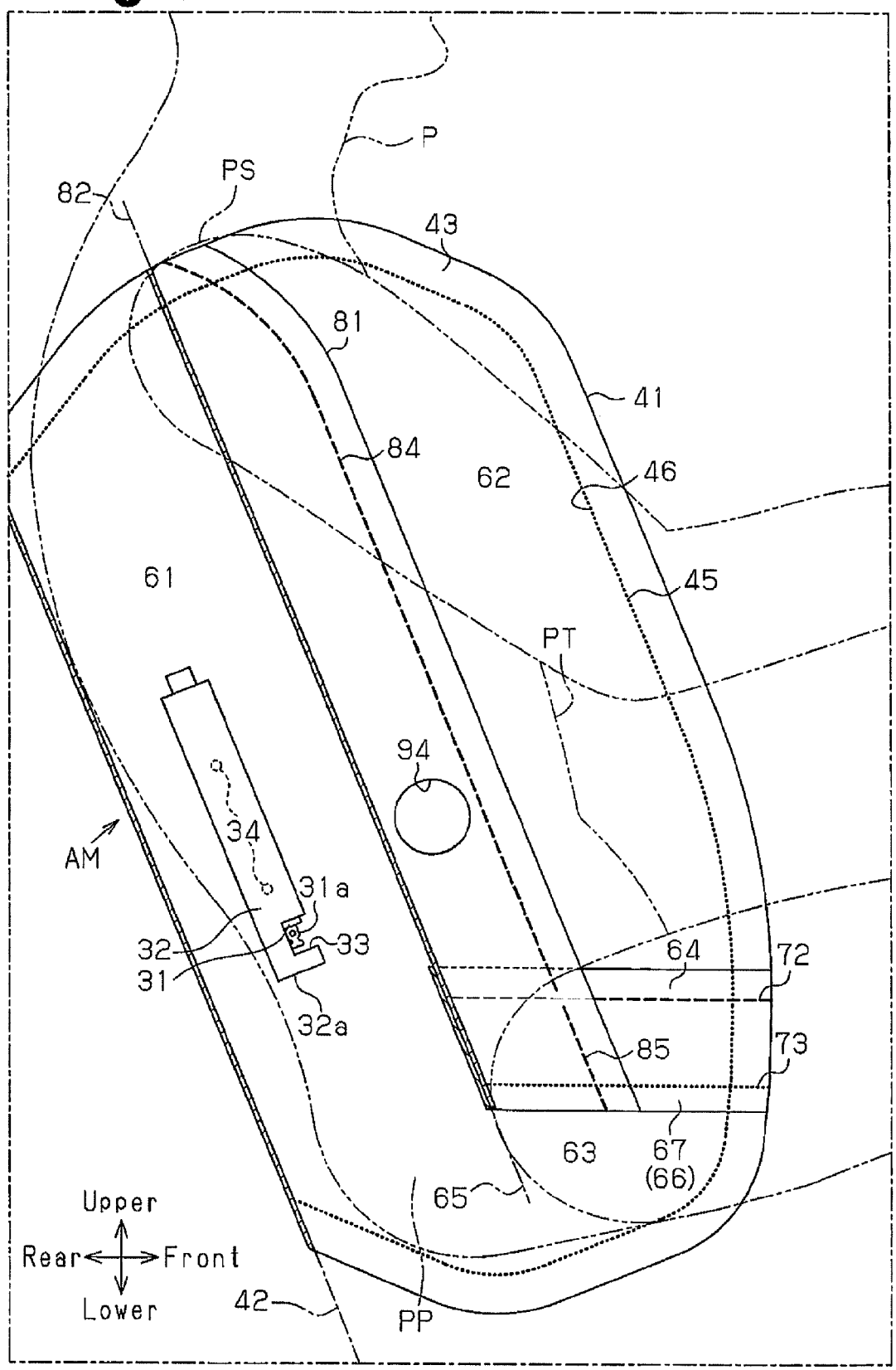
FIG. 17 is a side sectional view showing the internal structure of an airbag module according to a third embodiment of the present invention together with a passenger.
Figure 19A:
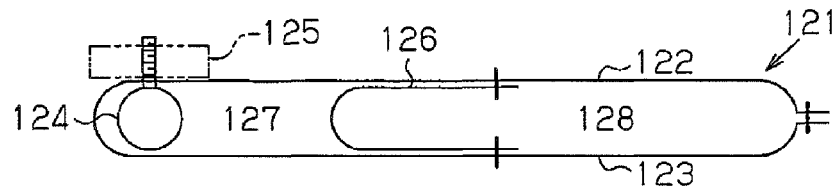
FIG. 19A is a schematic sectional view showing the respective positions of the inflator and the longitudinal partition portion in the airbag that is not inflated according to the prior art.
Figure 19B:
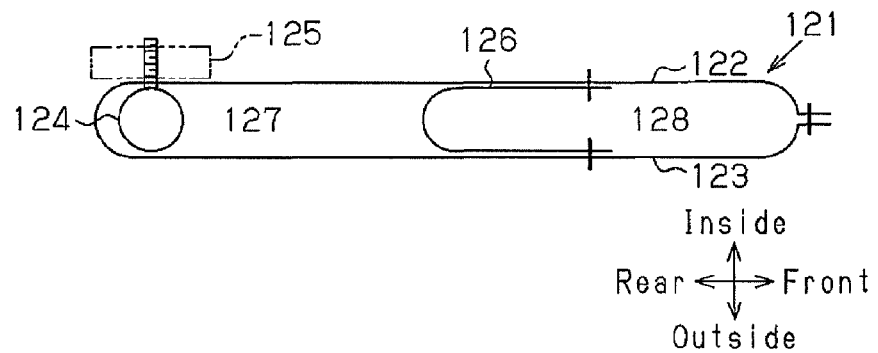
FIG. 19B is a schematic sectional view showing the respective positions of the inflator and the longitudinal partition portion in the airbag that is not inflated according to the prior art.

As shown in FIGS. 17 and 18, a horizontally long lateral partition portion 64 is folded in halves along a central bend line 65. The lateral partition portion 64 is arranged between two main body cloth portions 43 and 44 with the bend line 65 coinciding with a bend line 82 of a longitudinal partition portion 81. Unlike the first embodiment, the lateral partition portion 64 does not have the extension portions 68 and 71 and the joints 76 and 77.

The longitudinal partition portion 81 is composed of one piece of cloth extending in a substantially longitudinal direction. An upper end of the longitudinal partition portion 81 is overlaid on an upper end of an airbag 41. A lower end of the longitudinal partition portion 81 is overlaid on a lower end of the lateral partition portion 64. One pair of communication holes 94 are formed in a portion intermediate in a longitudinal direction of the longitudinal partition portion 81. The positions, the number, and the shapes of the communication holes 94 may be appropriately changed. Unlike the first embodiment, the longitudinal partition portion 81 does not have the pressure regulating valve 97.

An inflation portion 46 is partitioned into a rear inflation chamber 61, a front inflation chamber 62, and a lower inflation chamber 63. The rear inflation chamber 61 is arranged behind the longitudinal partition portion 81 and the lateral-partition portion 64. The front inflation chamber 62 is arranged in front of the longitudinal partition portion 81 and above the lateral partition portion 64. The lower inflation chamber 63 is arranged below the lateral partition portion 64. Like the first embodiment, an inflator 31 is attached to a side frame 17 together with the airbag 41 at a position between a rear end of the airbag 41 and the longitudinal partition portion 81.

In the side airbag apparatus according to the third embodiment, a part of inflation gas jetted from the inflator 31 is first supplied to the rear inflation chamber 61. With this supply, deployment and inflation of the rear inflation chamber 61 are started. Inflation gas supplied to the rear inflation chamber 61 is supplied to the front inflation chamber 62 through the communication holes 94 and is supplied from a lower end of the rear inflation chamber 61 to the lower inflation chamber 63. With this supply, deployment and inflation of the front inflation chamber 62 and the lower inflation chamber 63 are also started. Since the lateral partition portion 64 does not have the non-return valve 75, when jetting of inflation gas from the inflator 31 stops, inflation gas inside the lower inflation chamber 63 flows backward into the rear inflation chamber 61. For this reason, some measures need to be taken to keep an internal pressure of the lower inflation chamber 63 high in the third embodiment.

The rear inflation chamber 61 inflates not only in front of but also behind a position of attachment of the airbag 41 to the side frame 17. Thus, even in a case where the position of the longitudinal partition portion 126 is shifted forward to increase the inflation thickness T1 of the rear inflation chamber 127 shown in FIG. 15A, the above-described conventional problem is solved. That is, as shown in FIG. 15B, the rear inflation chamber 61 may be inflated behind the position of attachment of the airbag 41 to the side frame 17 by a distance by which the position of the longitudinal partition portion 126 is shifted. In this case as well, a length L1 from the position of attachment of the airbag 41 to a front end of the rear inflation chamber 61 is about equal to the length L1 from the position of attachment of the airbag 121 to the front end of the rear inflation chamber 127. As shown in FIG. 14B, a circumferential length on the car exterior side is larger than a circumferential length on the car interior side. For this reason, like the first embodiment, a spot of joining of the longitudinal partition portion 81 and the main body cloth portion 44 is located in front of a spot of joining of the longitudinal partition portion 81 and the main body cloth portion 43 at the time of inflation of the airbag 41.

Therefore, according to the third embodiment, the same advantages as (1) to (3) above can be achieved.

The above-described embodiments may be changed in the manners below.

A retainer which is closed at a lower end and is open only at an upper end may be used as the retainer 32. Alternatively, a retainer which is open at two upper and lower ends may be used.

A part of the inflator 31 may be arranged outside the inflation portion 46, and the remaining part may be arranged inside the inflation portion 46.

The airbag 41 may have a portion to which inflation gas is not supplied and which does not inflate.

The lateral partition portion 64 and the lower inflation chamber 63 may be omitted, and the inflation portion 46 may be partitioned into the rear inflation chamber 61 and the front inflation chamber 62 by the longitudinal partition portion 81.

Portions which are restrained and protected at the side of the passenger P by the rear inflation chamber 61 and the front inflation chamber 62 may be changed. For example, the rear inflation chamber 61 may deploy and inflate at the side of the front half of the chest PT, and the front inflation chamber 62 may deploy and inflate in front of the chest PT. In this case, the front inflation chamber 62 may function to regulate the internal pressure of the rear inflation chamber 61 by receiving inflation gas from the rear inflation chamber 61.

The lateral partition portion 64 may be a seam which is formed by sewing the two main body cloth portions 43 and 44 together.

The non-return valve 75 may be a member separate from the lateral partition portion 64.

Two margins of the longitudinal partition portion 81 may be joined to the main body cloth portions 43 and 44 inside the rear inflation chamber 61 or joined to the main body cloth portions 43 and 44 inside the front inflation chamber 62. Alternatively, one of the two margins of the longitudinal partition portion 81 may be joined inside the rear inflation chamber 61, and the other may be joined inside the front inflation chamber 62.

The form of portions which do not correspond to the communication hole 94 of the overlapping portions 91 may be changed as long as the distal ends 95t and 96t of the two valve body portions 95 and 96 come into contact at the time of deployment and inflation of the rear inflation chamber 61. For example, the portions that do not correspond to the communication hole 94 of the overlapping portions 91 may be joined in whole or in part through sewing or bonding. In this case, only portions which correspond to the communication hole 94 of the overlapping portions 91 are actuated as the two valve body portions 95 and 96. That is, the portions that do not correspond to the communication hole 94 of the overlapping portions 91 do not move wastefully. Alternatively, a notch may be formed in the portions that do not correspond to the communication hole 94 of the overlapping portions 91.

The longitudinal partition portion 81 and the two valve body portions 95 and 96 may be separate members.

A spot without joining by the inner joint 93 may be provided not near the bend line 82 but in a portion laterally off from the bend line 82. A plurality of spots without joining by the inner joint 93 may be provided.

The positions of the two valve body portions 95 and 96 before deployment and inflation of the inflation portion 46 may be changed from ones in the rear inflation chamber 61 to ones in the front inflation chamber 62.

The bend line 82 of the longitudinal partition portion 81 folded in halves when the inflation portion 46 is not inflated may be arranged downstream of the outer joints 84 and 85. In this case, the two valve body portions 95 and 96 before deployment and inflation of the inflation portion 46 may be located in the front inflation chamber 62.

The shape of the longitudinal partition portion 81 may be changed to a shape different from the shapes in the embodiments. In this case, the shape of the longitudinal partition portion 81 may be changed according to a portion which is restrained and protected by the rear inflation chamber 61 of the upper body of the passenger P. With this change, the forms of the outer joints 84 that join the longitudinal partition portion 81 to the main body cloth portions 43 and 44 are made different from those in the embodiments. For example, to restrain and protect a wider area of the shoulder PS of the passenger P, the outer joints 84 may be provided at positions in front of those in the embodiments. For example, portions which join the upper piece 86 of cloth and the main body cloth portions 43 and 44 of the outer joints 84 may be formed so as to incline more forward toward the top.

The storage portion 21, in which the airbag module AM is incorporated, may be formed in the side wall portion 11 instead of the seat back 14. In this case, the airbag 41 is attached to the side wall portion 11 at positions between the rear ends of the main body cloth portions 43 and 44 and the longitudinal partition portion.

The structure according to the second embodiment, in which the inflator 31 inside the airbag 41 is attached to the side frame 17 via the bracket 105, may be applied to the side airbag apparatus according to the third embodiment.

A side airbag apparatus may be applied to a car including the car seat 12 that faces sideward. In this case, the side airbag apparatus protects the passenger P when an impact is given from a front-back direction of a car.

A side airbag apparatus may be applied to an industrial truck in addition to an automobile and may be applied to a vehicle seat of an airplane, a ship, or the like.

The invention claimed is:

1. A side airbag apparatus attached to a vehicle and including an airbag,
   wherein the airbag is comprised of one pair of main body cloth portions that are overlaid on top of each other in a width direction of a vehicle seat,
   the airbag is formed in a bag shape by joining margins of the one pair of main body cloth portions,
   the airbag is deployed and inflated by inflation gas supplied from an inflator according to an impact given from the side of the vehicle seat,
   the airbag is portioned by a longitudinal partition portion into a rear inflation chamber and a front inflation chamber,
   the longitudinal partition portion is laid between the one pair of main body cloth portions and has a communication hole,
   the rear inflation chamber is arranged behind the longitudinal partition portion,
   the rear inflation chamber receives inflation gas supplied from the inflator,
   the front inflation chamber is arranged in front of the longitudinal partition portion,
   the front inflation chamber receives inflation gas supplied from the rear inflation chamber through the communication hole, one of the one pair of main body cloth portions is attached to the vehicle, the airbag is attached to the vehicle at a position between a rear end of the main body cloth portion attached to the vehicle and the longitudinal partition portion, and the airbag is attached to the vehicle without being inflated so that the airbag inflates both in front of and behind a position of attachment of the airbag to the vehicle, the airbag is attached to a seat frame inside the vehicle seat, the inflator is arranged at a position between a rear end of the airbag and the longitudinal partition portion inside the airbag, the inflator is attached by a locking member to the seat frame together with the main body cloth portion attached to the vehicle, and in a state that the airbag is attached to the vehicle without being inflated, the distance between a position where the main body cloth portion is attached to the vehicle and the rear end of the main body cloth portion is larger than the distance between a position where the main body cloth portion is attached to the vehicle and a rear end of the seat frame.

* * * * *